US012608215B2

(12) United States Patent
Singh et al.

(10) Patent No.: US 12,608,215 B2
(45) Date of Patent: Apr. 21, 2026

(54) MANAGING OUT-OF-BOX EXPERIENCE (OOBE) CONFIGURATION AT A CLIENT INFORMATION HANDLING SYSTEM

(71) Applicant: Dell Products L.P., Round Rock, TX (US)

(72) Inventors: Vishal Kumar Singh, Bangalore (IN); Jyothi Bandakka Nanjappa, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 85 days.

(21) Appl. No.: 18/680,258

(22) Filed: May 31, 2024

(65) Prior Publication Data

US 2025/0370767 A1 Dec. 4, 2025

(51) Int. Cl.
*G06F 9/445* (2018.01)
*H04L 43/0811* (2022.01)

(52) U.S. Cl.
CPC ...... *G06F 9/44505* (2013.01); *H04L 43/0811* (2013.01)

(58) Field of Classification Search
CPC .......................... G06F 9/44505; H04L 43/0811
USPC .......................................................... 713/1
See application file for complete search history.

(56) References Cited

U.S. PATENT DOCUMENTS

| | | | | |
|---|---|---|---|---|
| 6,714,992 | B1 * | 3/2004 | Kanojia | H04L 67/06 |
| | | | | 702/123 |
| 7,003,560 | B1 * | 2/2006 | Mullen | G06Q 10/06 |
| | | | | 709/224 |
| 7,149,978 | B1 * | 12/2006 | Maffezzoni | G06F 9/4411 |
| | | | | 717/174 |
| 7,200,649 | B1 * | 4/2007 | Batke | H04L 61/5046 |
| | | | | 370/252 |

(Continued)

OTHER PUBLICATIONS

Customize the Out of Box Experience (OOBE) (url: https://learn.microsoft.com/en-us/windows-hardware/customize/desktop/customize-oobe-in-windows-11) Sep. 29, 2021; 3 pages.

(Continued)

*Primary Examiner* — Paul R. Myers
(74) *Attorney, Agent, or Firm* — McDermott Will & Schulte LLP

(57) ABSTRACT

Managing a contextual OOBE configuration at a client information handling system, including detecting a boot experience at the client information handling system; in response to detecting the boot experience, verifying an active network connection at the client information handling system; in response to verifying the active network connection, providing a request to a server information handling system for a configuration file specific to the client information handling system; receiving, in response to the request and from the server information handling system, the configuration file; in response to receiving the configuration file: ceasing the boot experience; parsing the configuration file, including extracting values of the configuration (Continued)

file and creating an answer file with the extracted values; executing system preparation at the client information handling system; rebooting the client information handling system; performing the boot experience at the client information handling system utilizing the created answer file.

15 Claims, 6 Drawing Sheets

(56)                    References Cited

U.S. PATENT DOCUMENTS

| | | | | |
|---|---|---|---|---|
| 8,606,930 | B1 * | 12/2013 | Jain | H04L 47/522 |
| | | | | 709/227 |
| 9,661,374 | B1 * | 5/2017 | Erdmann | H04N 21/41407 |
| 2002/0161870 | A1 * | 10/2002 | French | H04L 67/34 |
| | | | | 709/237 |
| 2002/0198972 | A1 * | 12/2002 | Babbitt | H04L 12/1877 |
| | | | | 709/222 |
| 2004/0006688 | A1 * | 1/2004 | Pike | G06F 9/4406 |
| | | | | 713/1 |
| 2005/0198314 | A1 * | 9/2005 | Coon | H04L 69/24 |
| | | | | 709/228 |
| 2006/0085492 | A1 * | 4/2006 | Singh | G06F 16/954 |
| | | | | 707/999.203 |
| 2007/0143851 | A1 * | 6/2007 | Nicodemus | G06F 11/3495 |
| | | | | 726/4 |
| 2008/0034276 | A1 * | 2/2008 | Ficco | H04L 65/765 |
| | | | | 715/204 |
| 2009/0119778 | A1 * | 5/2009 | Bhuyan | G06F 9/441 |
| | | | | 726/25 |
| 2009/0307495 | A1 * | 12/2009 | Matsuo | H04L 9/0825 |
| | | | | 708/250 |
| 2010/0211943 | A1 * | 8/2010 | Chu | G06F 8/61 |
| | | | | 717/174 |
| 2010/0223297 | A1 * | 9/2010 | Li | G06F 9/5027 |
| | | | | 707/802 |
| 2010/0228836 | A1 * | 9/2010 | Lehtovirta | H04L 63/08 |
| | | | | 709/248 |
| 2012/0198344 | A1 * | 8/2012 | Tukol | G06F 9/4416 |
| | | | | 715/735 |
| 2013/0139183 | A1 * | 5/2013 | Mallur | G06F 8/63 |
| | | | | 719/321 |
| 2014/0047433 | A1 * | 2/2014 | Gaither | G06F 9/44526 |
| | | | | 709/224 |
| 2016/0330241 | A1 * | 11/2016 | Olivera | H04L 63/20 |
| 2017/0090896 | A1 * | 3/2017 | Lin | G06F 8/61 |
| 2017/0337071 | A1 * | 11/2017 | Scott | G06F 9/50 |
| 2018/0302406 | A1 * | 10/2018 | Burckhardt | H04L 63/1441 |
| 2025/0298899 | A1 * | 9/2025 | Eguchi | G06F 21/552 |

OTHER PUBLICATIONS

Sysprep (System Preparation) Overview (url: https://learn.microsoft.com/en-us/windows-hardware/manufacture/desktop/sysprep--system-preparation--overview?view=windows-11) May 2, 2023; 4 pages.
Use Answer Files with Sysprep (url: https://learn.microsoft.com/en-us/windows-hardware/manufacture/desktop/use-answer-files-with-sysprep?view=windows-11) Oct. 7, 2021; 4 pages.
Keyboard Filter (url: https://learn.microsoft.com/en-us/windows/iot/iot-enterprise/customize/keyboardfilter) Mar. 12, 2024; 6 pages.

* cited by examiner

_300_

_302_ Deploy Agent Computing Module

_304_ Update Answer File

_306_ Trigger Sysprep

_308_ Normalize Device

_310_ Shutdown Device

FIG. 4B                                                                                    400
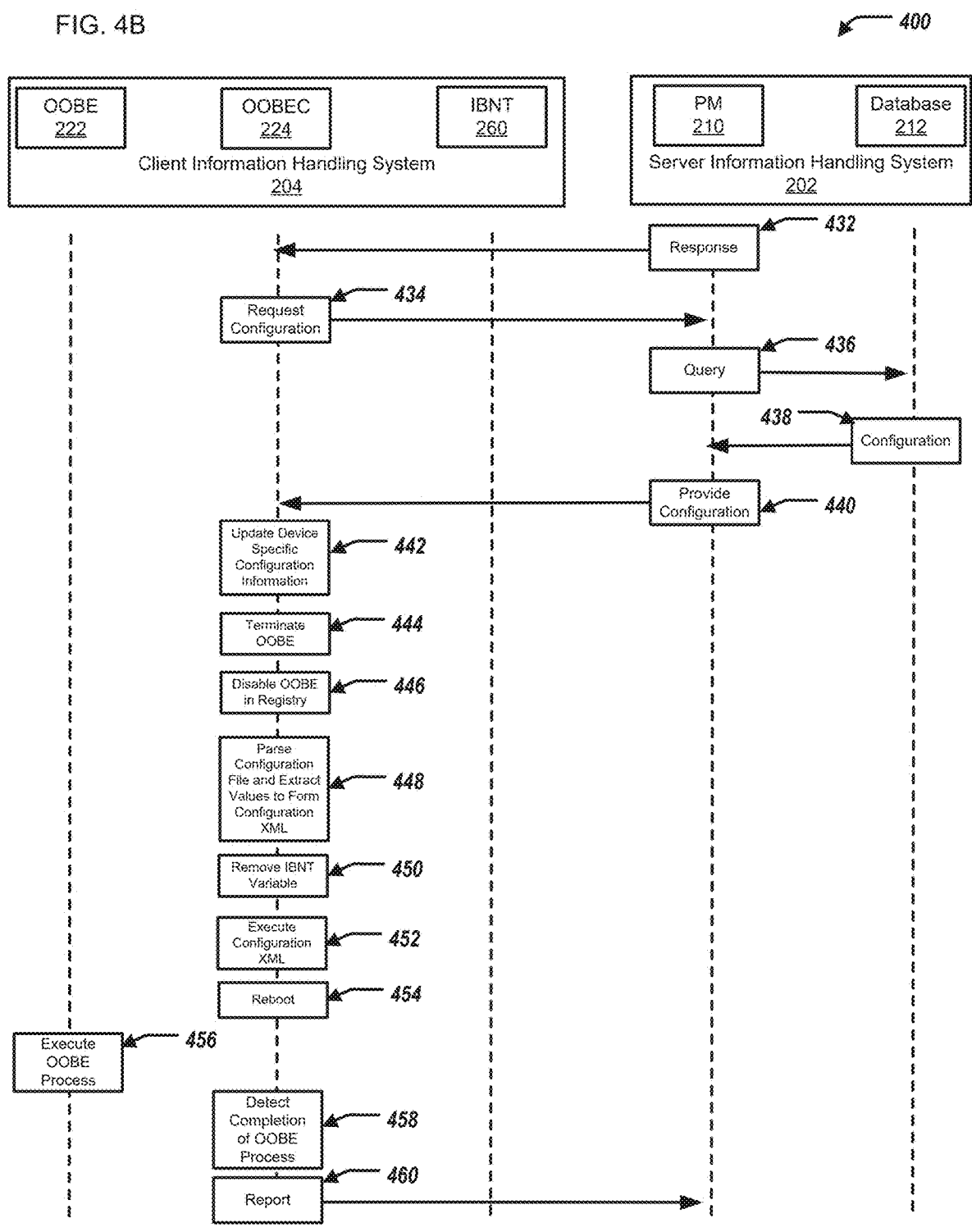

500

502
Detect Boot
Experience

504
Verify Active
Network
Connection

506
Provide Request
for Configuration
File

508
Receive
Configuration File

510
Ceasing Boot
Experience

512
Parse
Configuration File

514
Execute System
Preparation

516
Reboot Client
Information
Handling System

518
Perform Boot
Experience

MANAGING OUT-OF-BOX EXPERIENCE (OOBE) CONFIGURATION AT A CLIENT INFORMATION HANDLING SYSTEM

BACKGROUND

Field of the Disclosure

The disclosure relates generally to an information handling system, and in particular, managing an out-of-box experience (OOBE) configuration at a client information handling system.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An out-of-box experience (OOBE) is a series of screens that require customers to accept license agreements, connect to the Internet, log in with, or sign up for, a Microsoft Account (MSA), and share information with an original equipment manufacturer (OEM). The choices you make in your hardware and software determine how much work customers must do to complete OOBE before they can enjoy their new devices.

SUMMARY

Innovative aspects of the subject matter described in this specification may be embodied in a method of managing a contextual out-of-box experience (OOBE) configuration at a client information handling system, including detecting a boot experience at the client information handling system; in response to detecting the boot experience, verifying an active network connection at the client information handling system; in response to verifying the active network connection at the client information handling system, providing a request to a server information handling system for a configuration file specific to the client information handling system, the server information handling system in communication with the client information handling system; receiving, in response to the request and from the server information handling system, the configuration file; in response to receiving the configuration file: ceasing the boot experience; parsing the configuration file, including extracting values of the configuration file and creating an answer file with the extracted values; executing system preparation at the client information handling system; rebooting the client information handling system; and performing the boot experience at the client information handling system utilizing the created answer file.

Other embodiments of these aspects include corresponding systems, apparatus, and computer programs, configured to perform the actions of the methods, encoded on computer storage devices.

These and other embodiments may each optionally include one or more of the following features. For instance, calculating a device hash associated with the client information handling system; checking in with the server information handling system utilizing the device hash; and receiving the configuration file after success of the check-in. Identifying a value of a variable representing a connectivity state of the client information handling system; and determining that the value of the variable indicates that the client information handling system does not have network connectivity, and in response, detecting launch of the boot experience at the client information handling system. Identifying a value of a variable representing a connectivity state of the client information handling system; and determining that the value of the variable indicates that the client information handling system does have network connectivity, and in response, waiting for the active network connection at the client information handling system. In response to receiving the configuration file, disabling OOBE at a registry of the client information handling system. After performing the boot experience at the client information handling system, providing a notification to the server information handling system indicating competition of the boot experience.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF DRAWINGS

FIGS. 4A, 4B illustrate a swim-lane diagram for managing an OOBE configuration at a client information handling system.

DESCRIPTION OF PARTICULAR EMBODIMENT(S)

Figure 1:
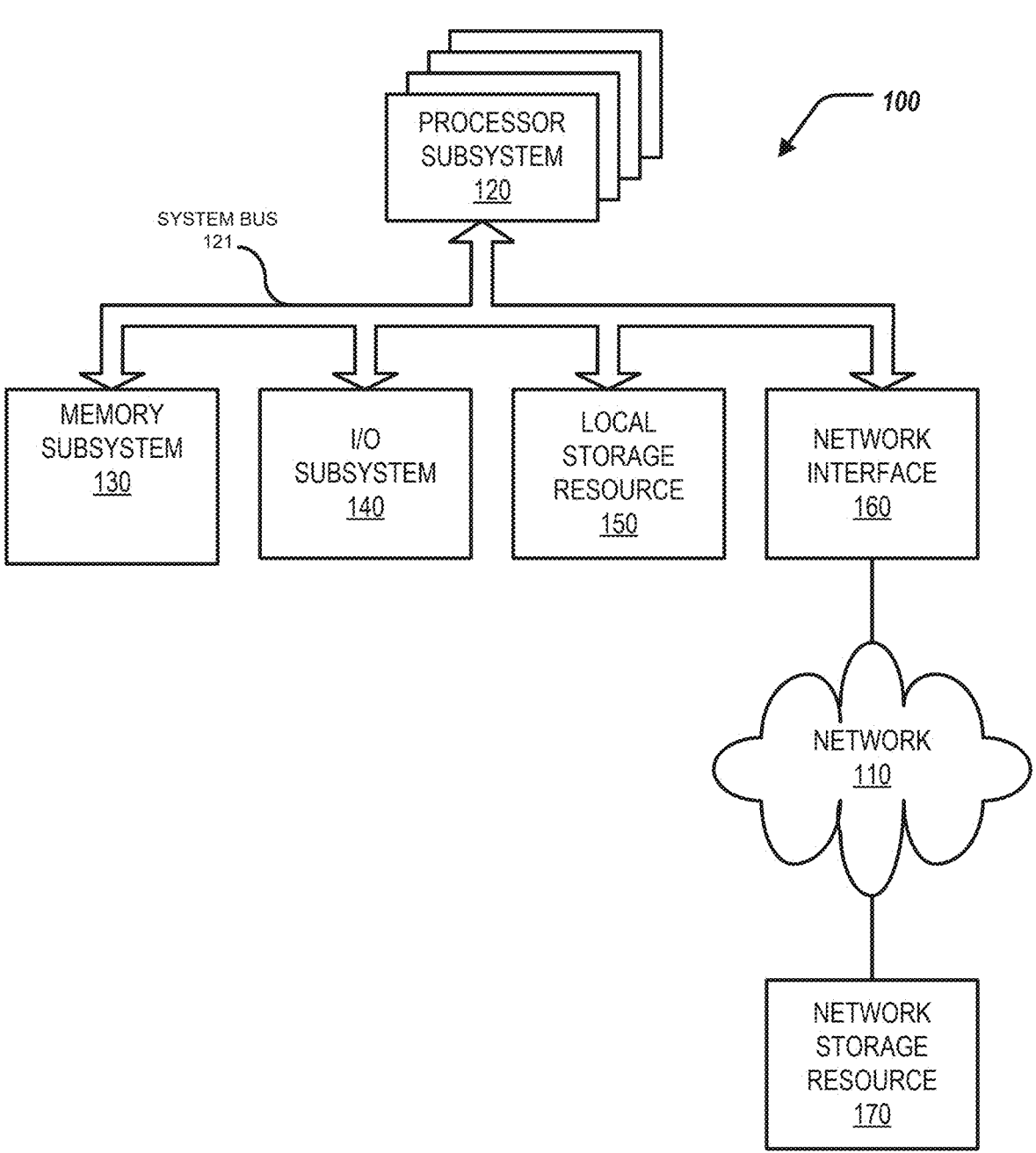
FIG. 1 is a block diagram of selected elements of an embodiment of an information handling system.

This disclosure discusses methods and systems for managing an out-of-box experience (OOBE) configuration at a client information handling system. In short, an adaptive system and method is provided for automating the first boot experience for the user that only depends on the network connectivity of the client information handling system, while ensuring that such is fully compliant with security policies (of an organization) as part of the first boot flow. In other words, contextual deployment of custom configurations is provided securely in a remote setup during the OOBE phase for extending the sysprep customization options at runtime.

Specifically, this disclosure discusses a system and a method for managing a contextual out-of-box experience (OOBE) configuration at a client information handling system, including detecting a boot experience at the client information handling system; in response to detecting the boot experience, verifying an active network connection at the client information handling system; in response to verifying the active network connection at the client information handling system, providing a request to a server information handling system for a configuration file specific to the client information handling system, the server information handling system in communication with the client information handling system; receiving, in response to the request and from the server information handling system, the configuration file; in response to receiving the configuration file: ceasing the boot experience; parsing the configuration file, including extracting values of the configuration file and creating an answer file with the extracted values; executing system preparation at the client information handling system; rebooting the client information handling system; and performing the boot experience at the client information handling system utilizing the created answer file.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such as wires, optical fibers, microwaves, radio waves, and other electromagnetic and/or optical carriers; and/or any combination of the foregoing.

Particular embodiments are best understood by reference to FIGS. 1-5 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mounted display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include one or more processing resources such as a central processing unit (CPU), microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, a camera, or another type of peripheral device.

Local storage resource 150 may comprise computer-readable media (e.g., hard disk drive, floppy disk drive, CD-ROM, and/or other types of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other types of rotating storage media, flash memory, EEPROM, and/or other types of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g., corporate) network. The network may be implemented as, or may be a part of, a storage area network (SAN), a personal area network (PAN), a local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g., customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet, or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Figure 2:
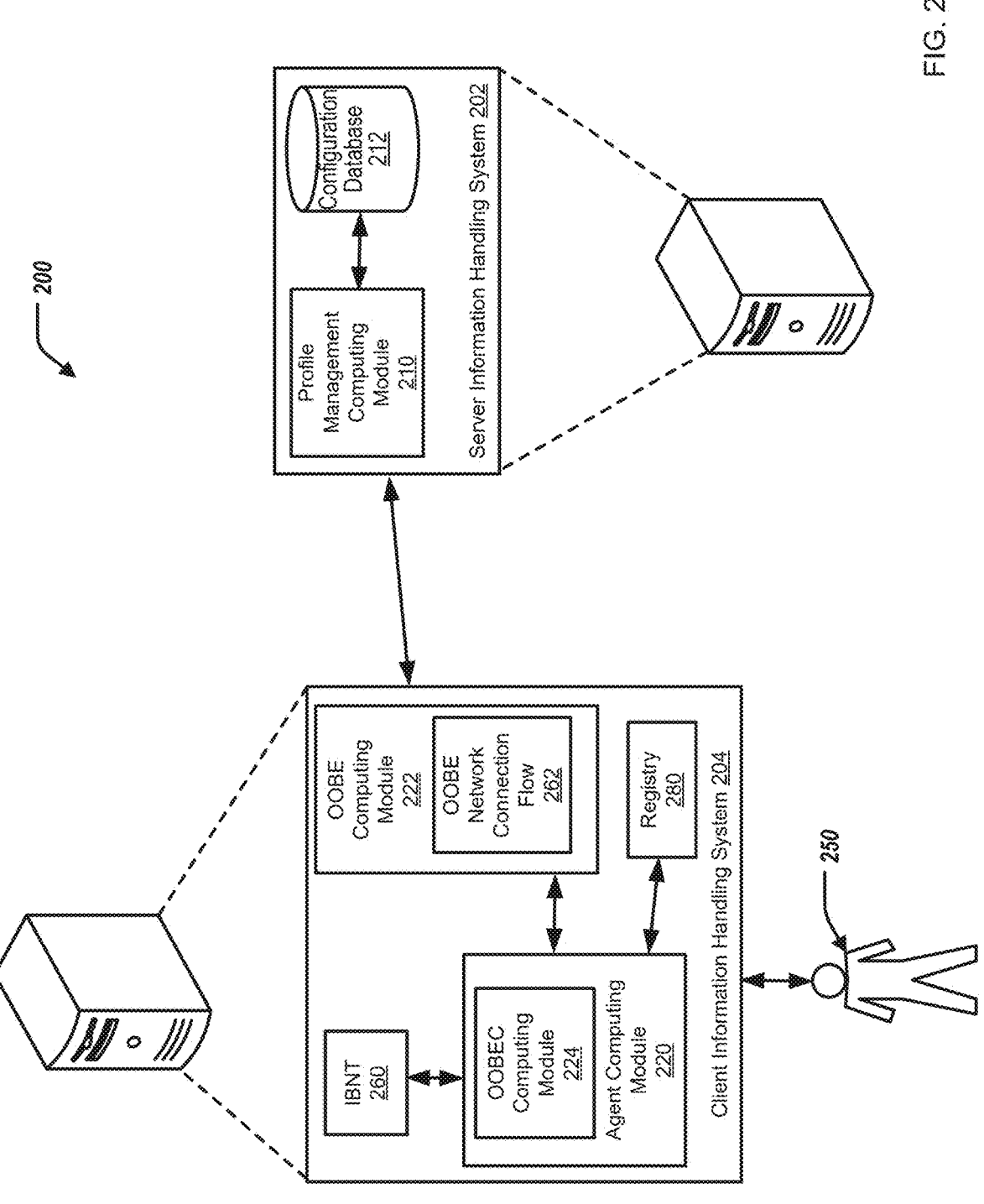
FIG. 2 illustrates a block diagram of an environment for managing an out-of-box experience (OOBE) configuration at a client information handling system.

Turning to FIG. 2, FIG. 2 illustrates an environment 200 including a server information handling system 202 and a client information handling system 204. The server information handling system 202 can include a profile management (PM) computing module 210 and a configuration database 212. The PM computing module 210 can facilitate mapping user and device profiles to respective management groups, described further herein. In some examples, the server information handling system 202 is similar to, or includes, the information handling system 100 of FIG. 1.

The client information handling system 204 can include an agent computing module 220 and an out-of-box experience (OOBE) computing module 222. The agent computing module 220 can include an OOBE concierge (OOBEC) computing module 224. The OOBEC computing module 224 can facilitate end-to-end management of a custom OOBE workflow, described further herein.

The server information handling system 202 can be in communication with the client information handling system 204, e.g., over a network (the "Internet").

In short, the environment 200 provides an adaptive system and method for automating the first boot experience for the user 250 that only depends on the network connectivity of the client information handling system 204. Further, the environment 200 ensures that such is fully compliant with security policies (of an organization) as part of the first boot flow. In other words, the environment 200 provides for contextual deployment of custom configurations securely in a remote setup during the OOBE phase for extending the sysprep customization options at runtime.

Figure 3:
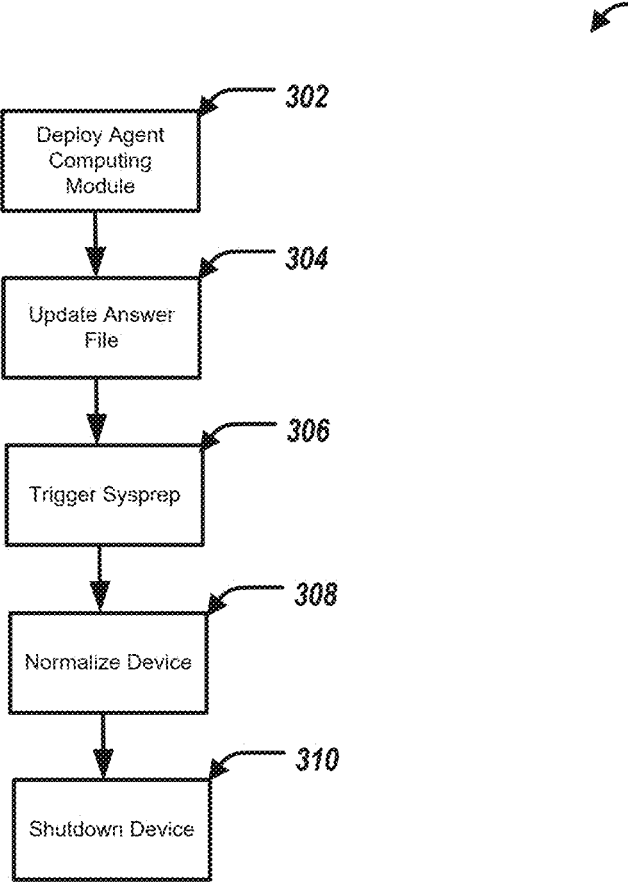
FIG. 3 illustrates a method for managing an OOBE configuration at a client information handling system.

FIG. 3 illustrates a flowchart depicting selected elements of an embodiment of a method 300 for managing an OOBE configuration at a client information handling system. The method 300 may be performed by the information handling system 100, the server information handling system 202, the client information handling system 204, the profile management computing module 210, the OOBE computing module 220, and/or the OOBEC computing module 222, and with reference to FIGS. 1-2. It is noted that certain operations described in method 300 may be optional or may be rearranged in different embodiments.

In short, FIG. 3 represents a "PreOOBEC" phase that is executed at a second touch facility or pre-shipment factory. Specifically, the agent computing module 220 is deployed at the client information handling system 204, at 302. An answer file is updated at the client information handling system 204, at 304. Specifically, a factory default windows setting or facDEF.xml file is updated at the client information handling system 204. Sysprep is triggered at the client information handling system 204, at 306. Specifically, sysprep is triggered at the client information handling system 204, with facDEF.xml as the answer file. The client information handling system 204 gets normalized (pre-sysprep phase), at 308. Specifically, this is the sysprep process before shutdown of the client information handling system 204, and normalizes the hostname of the client information handling system 204 by removing device specific details as part of the generalized sysprep pass. The client information handling system 204 is then shutdown (powered down), at 310. The client information handling system 204 is then shipped to the end user 250.

Figure 4A:
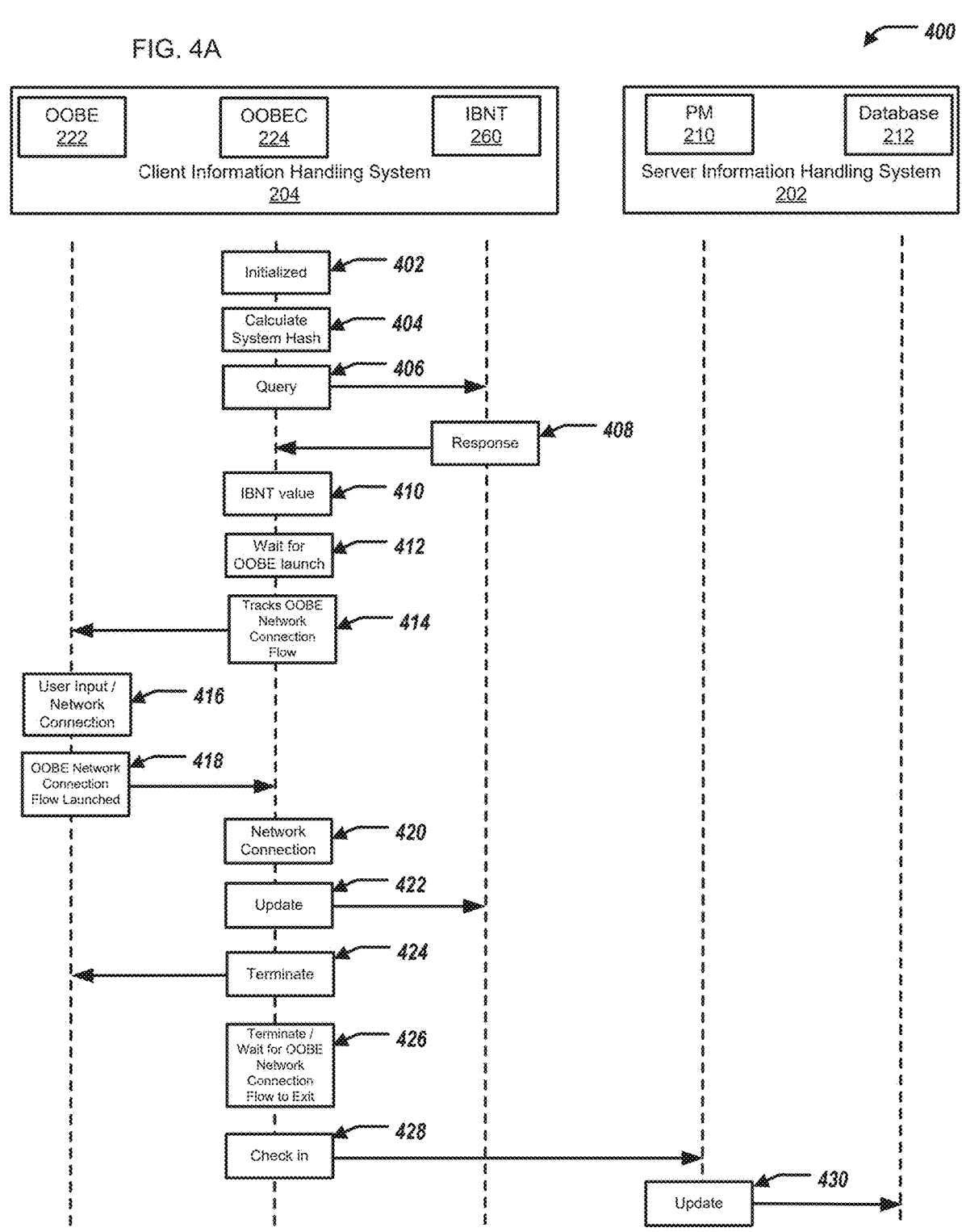

FIG. 4 illustrates a swim-lane diagram depicting selected elements of an embodiment of a method 400 for managing an OOBE configuration at a client information handling system. The method 400 may be performed by the information handling system 100, the server information handling system 202, the client information handling system 204, the profile management computing module 210, the OOBE computing module 220, and/or the OOBEC computing module 222, and with reference to FIGS. 1-2. It is noted that certain operations described in method 400 may be optional or may be rearranged in different embodiments.

The client information handling system 204 is booted up (e.g., the user 250 boots up the client information handling system 204); and the client information handling system 204 boots into OOBE (Windows OOBE) with a default system account. The OOBEC computing module 224 is initialized, at 402. Specifically, the agent computing module 220 is started and the OOBEC computing module 224 is initialized. The OOBEC computing module 224 calculates a device hash associated with the client information handling system 204, at 404. The hash can be referred to as "SystemHash."

The OOBEC computing module 224 queries an intra boot network tag (IBNT) 260, at 406. Specifically, the IBNT 260 is a NVRAM variable that represents a connectivity state of the client information handling system 204 across OOBE boots. The OOBEC computing module 224 receives a response of the state of the IBNT 260, at 410. In short, the OOBEC computing module 224 identifies a value of the IBNT 260 (a variable representing a connectivity state of the client information handling system 204).

The OOBEC computing module 224 determines whether the value of the IBNT 260 indicates that the client information handling system 204 has network connectivity or not, at 410. In some examples, the OOBEC computing module 224 determines whether the value of the IBNT 260 indicates that the client information handling system 204 does not have a network connection (IBNT 260 indicates a value of "null"). The OOBEC computing module 224, in response to such, detects a boot experience at the client information handling system 204, at 412. Specifically, the OOBEC computing module 224 waits for OOBE launch at the client information handling system 204. That is, the OOBEC computing module 224, in response to such, waits for/detects launch of the boot experience at the client information handling system 204. In short, launch of OOBE (or OOBE.exe) is the executable which is responsible for the initial boot experience at the client information handling system 204—including the OOBE startup initialization screens.

Further, the OOBEC computing module 224 tracks OOBE network connection flow 262, at 414. Specifically, the OOBEC computing module 224, when OOBE.exe is launched, waits for the OOBE network connection flow 262 (OOBENetworkConnectionFlow.exe) to be loaded/launched. The OOBE computing module 222 receives user input indicating network connection login details, at 416. The user input can include selection of a network, and login credentials for such network. The OOBE computing module 222 launches the OOBE network connection flow 262 (OOBENetworkConnectionFlow.exe), at 418. The method then proceeds to step 420.

In some examples, the OOBEC computing module 224 determines the value of the IBNT 260 indicates that the client information handling system 204 does have a network connection (IBNT 260 does not indicate a value of "null"). In response to such, the OOBEC computing module 224 waits for the active network connection at the client information handling system 402, and proceeds to step 420.

In response to detecting the boot experience, the OOBEC computing module 224 verifies a network connection at the client information handling system 204, at 420. That is, when the OOBE network connection flow 262 (OOBENetworkConnectionFlow.exe) is loaded/launched, the OOBEC computing module 224 checks/verifies for an active network connection. In some examples, the OOBEC computing module 224 verifies a wireless network profile (XML) or network is detected. When a wireless network profile (stored as an XML file) is created, this confirms the presence of a wireless network and a connectivity check is performed to ensure access to the network (e.g., the Internet). For wired networks, a connectivity validation with the network (Internet) is performed.

The OOBEC computing module 224 updates the value of the IBNT 260, at 422. In some examples, when the OOBEC computing module 224 does not verify a network connection at the client information handling system 204 (or a timeout occurs), the OOBEC computing module 224 updates the value of the IBNT 260 to false (at 422), and further ceases the boot experience (OOBE.exe), ceases the OOBE network connection flow 262 (OOBENetworkConnectionFlow.exe), and reboots the client information handling system 204, at 424. In some examples, when the OOBEC computing module 224 verifies a network connection at the client information handling system 204, the OOBEC computing module 224 updates the value of the IBNT 260 to true (at 422); and further ceases the OOBE network connection flow 262 (OOBENetworkConnectionFlow.exe) and waits for the OOBE network connection flow 262 (OOBENetworkConnectionFlow.exe) to exit, at 426.

The OOBEC computing module 224 checks in with the PM computing module 210 at the server information handling system 202 utilizing the device hash, at 428. The PM computing module 210 stores the device hash (of the client information handling system 204) at the database 212, at 430. This blocks the trigger of any other processing job to the client information handling system 204 unless the OOBEC computing module 224 confirms a success.

The PM computing module 210 provides a response to the check-in to the OOBEC computing module 224, at 432. The response to the check-in can include a successful connection indication between the client information handling system 204 and the server information handling system 202 (e.g., HTTP 200 OK success).

The OOBEC computing module 224, in response to verifying the active network connection at the client information handling system 204, provides a request to the PM computing module 210 for a configuration file specific/related to the client information handling system 204, at 434. In other words, the OOBEC computing module 224 makes a "get" call to the PM computing module 210 to fetch the group specific configuration file (json file) (e.g., GroupSpecificConfig.json).

The PM computing module 210 queries the database 212 for the configuration file (device specific configuration file), at 436. This configuration file is inferred by the OOBEC computing module 224 to formulate an updated version of the sysprep XML file, and then leveraged to perform another sysprep with the OOBE phase alone, described further herein. The PM computing module 210 receives a response from the database 212, at 438. The response indicates an object relational mapping (ORM) layer fetching data which gets serialized into the group specific configuration file (json file) (e.g., GroupSpecificConfig.json). The PM computing module 210 provides the configuration file to the OOBEC computing module 224, at 440. That is, the OOBEC computing module 224 receives the configuration file (in response to the request at 434). In some examples, the OOBEC computing module 224 receives the configuration file after success of the check-in (at 428).

The OOBEC computing module 224 updates device specific configuration information at the client information handling system 204, at 442. Specifically, upon receipt of the configuration file, the OOBEC computing module 224 parses the configuration file and updates the unattend.xml file (at, e.g., C:\Windows\System32\sysprep path) with the device-specific configuration information.

The OOBEC computing module 224 ceases the boot experience, at 444. That is, the OOBEC computing module 224 terminates OOBE (e.g., OOBE.exe) and disables any further execution of any previous OOBE which was running (utilizing facdef.exe). The OOBEC computing module 224 disables OOBE in a registry 280 of the client information handling system 204, at 446. For example, the OOBEC computing module 224 disables OOBE in the registry 280—HKLM\Software\Policies\Microsoft\Windows\OOBE. The OOBEC computing module 224 parses the configuration file, at 448. Specifically, the OOBEC computing module 224 parses the configuration file, including extracting values of the configuration file and creating an answer file (or updating a previous answer file) with the extracted values. For example, the OOBEC computing module 224 parses the group specific configuration file (e.g., GroupSpecificConfig.json), extracts values for the OOBE system phase, and creates a new answer file for the first boot experience (e.g., GroupSpecificConfig.xml).

The OOBEC computing module 224 removes the IBNT 260, at 450. The OOBEC computing module 224 executes the system repreparation at the client information handling system 204, at 452. That is, the OOBEC computing module 224 runs sysprep/OOBE unattend: GroupSpecificConfig.xml. The OOBEC computing module 224 reboots the client information handling system 204, at 454.

The OOBE computing module 222 performs the boot experience at the client information handling system 204 utilizing the created answer file, at 456. That is, the OOBE computing module 222 executes the OOBE process, that is, the automated OOBE process.

The OOBEC computing module 224 detects completion of the OOBE process, at 458. That is, the OOBEC computing module 224 waits for CloudExperienceHost to terminate that indicates completion of the OOBE. The OOBEC computing module 224 provides a notification to the server information handling system 202 indicating completion of the boot experience, at 460. Specifically, the OOBEC computing module 224 reports completion of the OOBE process to the PM computing module 210. That is, the OOBEC computing module 224 reports success of the OOBE process, and the final sysprep is marked as complete.

Figure 5:
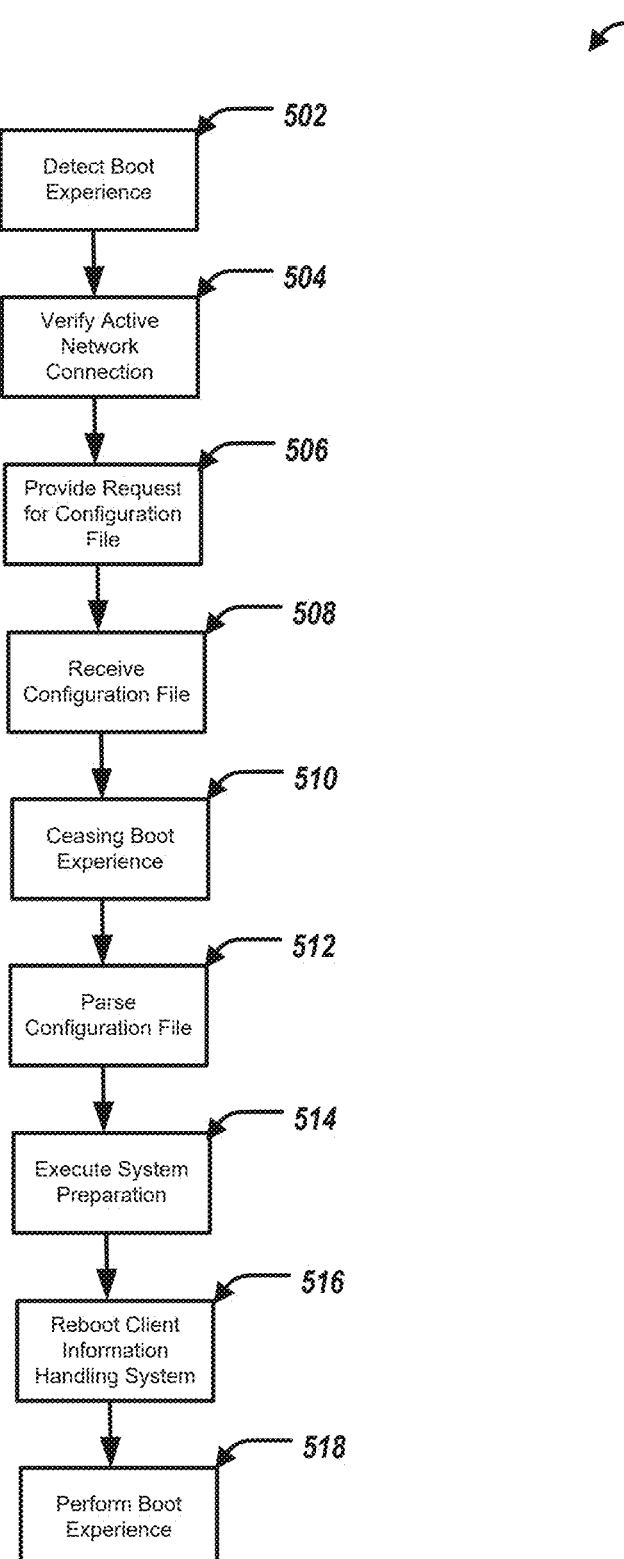
FIG. 5 illustrates a method for managing an OOBE configuration at a client information handling system.

FIG. 5 illustrates a flowchart depicting selected elements of an embodiment of a method 500 for managing an OOBE configuration at a client information handling system. The method 500 may be performed by the information handling system 100, the server information handling system 202, the client information handling system 204, the profile management computing module 210, the OOBE computing module 220, and/or the OOBEC computing module 222, and with reference to FIGS. 1-2. It is noted that certain operations described in method 500 may be optional or may be rearranged in different embodiments.

The OOBEC detects a boot experience at the client information handling system 304, at 502. The OOBEC computing module 224, in response to detecting the boot experience, verifies an active network connection at the client information handling system 304, at 504. The OOBEC computing module 224, in response to verifying the active network connection at the client information handling system 204, provides a request to the server information handling system 202 for a configuration file specific to the client information handling system 204, at 506. The OOBEC computing module 224 receives, in response to the request and from the server information handling system 202, the configuration file, at 508. The OOBEC computing module 224, in response to receiving the configuration file, ceases the boot experience, at 510. The OOBEC computing module 224, further in response to receiving the configuration file, parses the configuration file, including extracting values of the configuration file and creating an answer file with the extracted values, at 512. The OOBEC computing module 224, further in response to receiving the configuration file, executes system preparation at the client information handling system 204, at 514. The OOBEC computing module 224, further in response to receiving the configuration file, reboots the client information handling system 204, at 516. The OOBEC computing module 224, further in response to receiving the configuration file, performs the boot experience at the client information handling system 204 utilizing the created answer file, at 518.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

What is claimed is:

1. A computer-implemented method of managing a contextual out-of-box experience (OOBE) configuration at a client information handling system, including:

detecting a boot experience at the client information handling system;

in response to detecting the boot experience, verifying an active network connection at the client information handling system, including:

querying a value of an intra boot network tag (IBNT) that represents a connectivity state of the client information handling system across OOBE boots;

determining, based on the querying, that the IBNT indicates that the client information handling system does have network connectivity, and in response, waiting for the active network connection at the information handling system;

in response to verifying the active network connection at the client information handling system, providing a request to a server information handling system for a configuration file specific to the client information handling system, the server information handling system in communication with the client information handling system;

receiving, in response to the request and from the server information handling system, the configuration file;

in response to receiving the configuration file:

ceasing the boot experience;

parsing the configuration file, including extracting values of the configuration file and creating an answer file with the extracted values;

executing system preparation at the client information handling system;

rebooting the client information handling system; and performing the boot experience at the client information handling system utilizing the created answer file.

2. The computer-implemented method of claim 1, further including:

calculating a device hash associated with the client information handling system;

checking in with the server information handling system utilizing the device hash; and receiving the configuration file after success of the check-in.

3. The computer-implemented method of claim 1, further including:

identifying a value of a variable representing a connectivity state of the client information handling system; and determining that the value of the variable indicates that the client information handling system does have network connectivity, and in response, waiting for the active network connection at the client information handling system.

4. The computer-implemented method of claim 1, further in response to receiving the configuration file, disabling OOBE at a registry of the client information handling system.

5. The computer-implemented method of claim 1, wherein after performing the boot experience at the client information handling system, providing a notification to the server information handling system indicating competition of the boot experience.

6. An information handling system comprising a processor having access to memory media storing instructions executable by the processor to perform operations, comprising:

detecting a boot experience at the client information handling system;

in response to detecting the boot experience, verifying an active network connection at the client information handling system, including:

querying a value of an intra boot network tag (IBNT) that represents a connectivity state of the client information handling system across OOBE boots;

determining, based on the querying, that the IBNT indicates that the client information handling system does have network connectivity, and in response, waiting for the active network connection at the information handling system;

in response to verifying the active network connection at the client information handling system, providing a request to a server information handling system for a configuration file specific to the client information handling system, the server information handling system in communication with the client information handling system;

receiving, in response to the request and from the server information handling system, the configuration file;

in response to receiving the configuration file:

ceasing the boot experience;

parsing the configuration file, including extracting values of the configuration file and creating an answer file with the extracted values;

executing system preparation at the client information handling system;

rebooting the client information handling system; and performing the boot experience at the client information handling system utilizing the created answer file.

7. The information handling system of claim 6, the operations further including:

calculating a device hash associated with the client information handling system;

checking in with the server information handling system utilizing the device hash; and receiving the configuration file after success of the check-in.

8. The information handling system of claim 6, the operations further including:

identifying a value of a variable representing a connectivity state of the client information handling system; and determining that the value of the variable indicates that the client information handling system does have network connectivity, and in response, waiting for the active network connection at the client information handling system.

9. The information handling system of claim 6, the operations further including further in response to receiving the configuration file, disabling OOBE at a registry of the client information handling system.

10. The information handling system of claim 6, the operations further including after performing the boot experience at the client information handling system, providing a notification to the server information handling system indicating competition of the boot experience.

11. A non-transitory computer-readable medium storing software comprising instructions executable by one or more computers which, upon such execution, cause the one or more computers to perform operations comprising:

detecting a boot experience at the client information handling system;

in response to detecting the boot experience, verifying an active network connection at the client information handling system, including:

querying a value of an intra boot network tag (IBNT) that represents a connectivity state of the client information handling system across OOBE boots;

determining, based on the querying, that the IBNT indicates that the client information handling system does have network connectivity, and in response, waiting for the active network connection at the information handling system;

in response to verifying the active network connection at the client information handling system, providing a request to a server information handling system for a configuration file specific to the client information handling system, the server information handling system in communication with the client information handling system;

receiving, in response to the request and from the server information handling system, the configuration file;

in response to receiving the configuration file:

ceasing the boot experience;

parsing the configuration file, including extracting values of the configuration file and creating an answer file with the extracted values;

executing system preparation at the client information handling system;

rebooting the client information handling system; and

14 performing the boot experience at the client information handling system utilizing the created answer file.

12. The non-transitory computer-readable medium of claim 11, the operations further including:

calculating a device hash associated with the client information handling system;

checking in with the server information handling system utilizing the device hash; and receiving the configuration file after success of the check-in.

13. The non-transitory computer-readable medium of claim 11, the operations further including:

identifying a value of a variable representing a connectivity state of the client information handling system; and determining that the value of the variable indicates that the client information handling system does have network connectivity, and in response, waiting for the active network connection at the client information handling system.

14. The non-transitory computer-readable medium of claim 11, the operations further including further in response to receiving the configuration file, disabling OOBE at a registry of the client information handling system.

15. The non-transitory computer-readable medium of claim 11, the operations further including after performing the boot experience at the client information handling system, providing a notification to the server information handling system indicating competition of the boot experience.

* * * * *